Aug. 17, 1943.     A. L. CONN     2,327,175

CATALYST CONTROL IN HYDROCARBON CONVERSION

Filed Oct. 31, 1941     3 Sheets-Sheet 1

Fig. 1

Inventor:
Arthur L. Conn
By Vanderveer Voorhees
Attorney

Patented Aug. 17, 1943

2,327,175

UNITED STATES PATENT OFFICE 2,327,175

CATALYST CONTROL IN HYDROCARBON CONVERSION

Arthur L. Conn, Chicago, Ill., assignor to Standard Oil Company, Chicago, Ill., a corporation of Indiana Application October 31, 1941, Serial No. 417,258

14 Claims. (Cl. 196—52)

This invention relates to the conversion of hydrocarbon oils and more particularly to an apparatus for the conversion of heavy oils into gasoline by contacting in a continuous system with suspended, powdered, solid catalysts. The object of the invention is to effect conversion by an improved system of control when contacting hydrocarbon vapors with subdivided catalysts in a continuous system.

Figure 2:
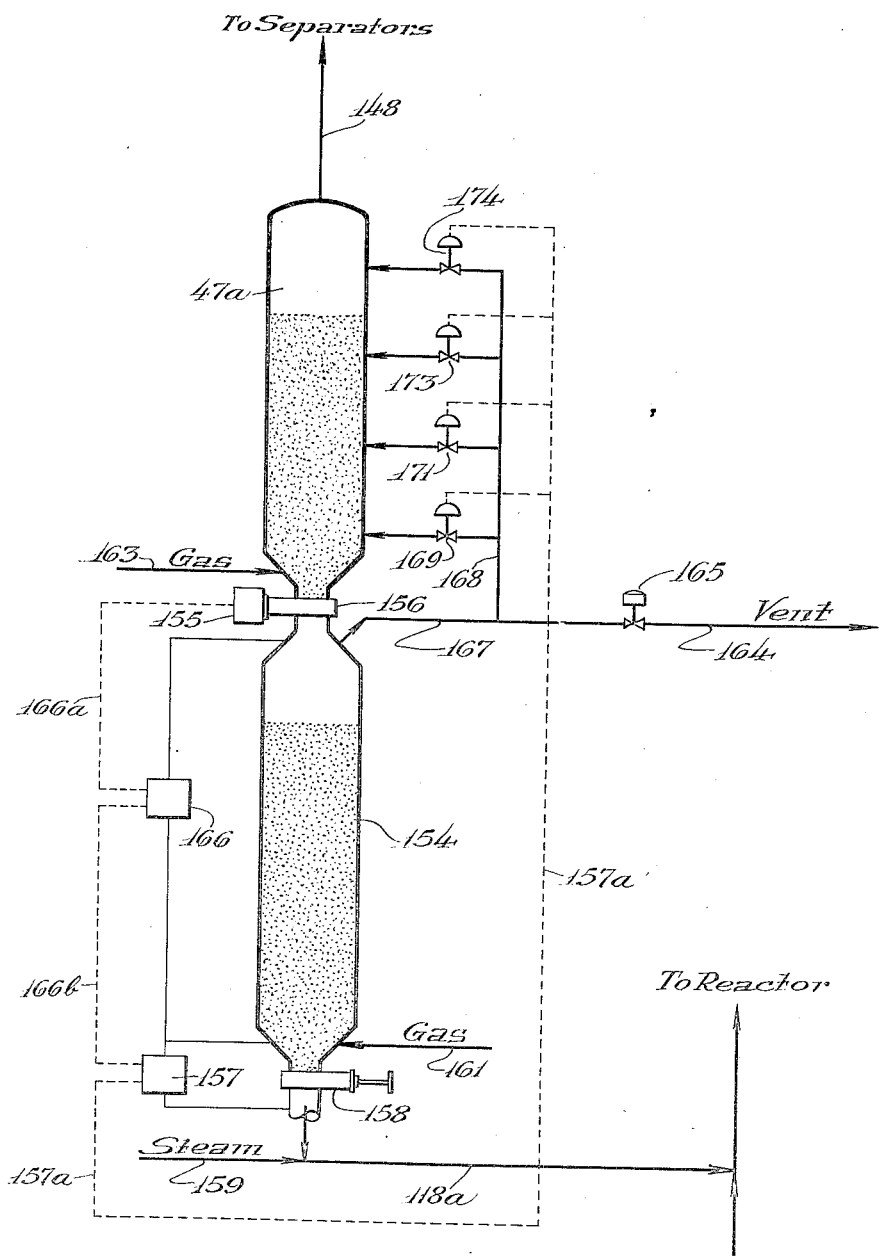
Figure 3:
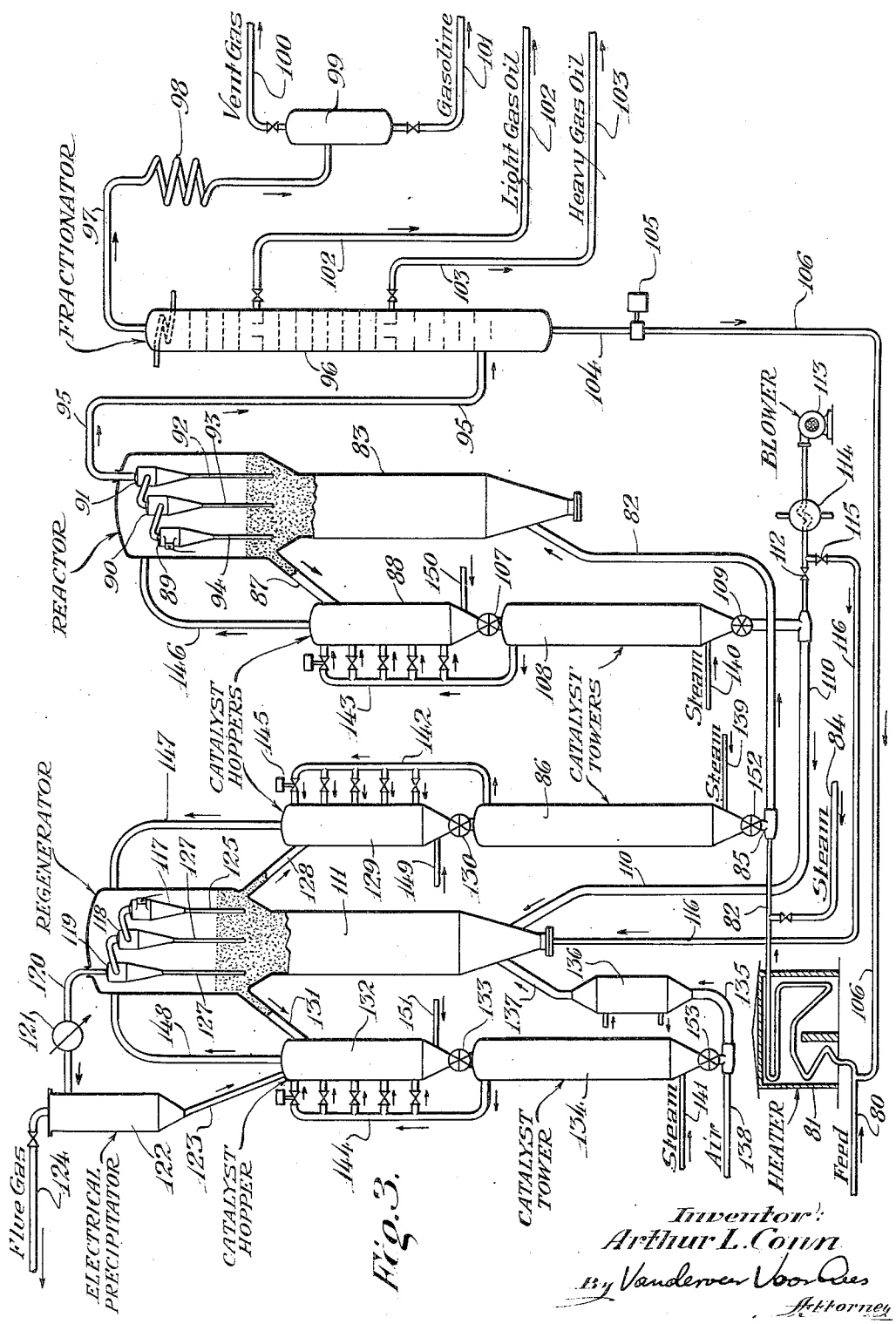

The invention will be readily understood by referring to the accompanying drawings in which Figure 1 illustrates an apparatus in which the improved system of control is applied to a hydrocarbon converter in which the suspended catalyst is carried up, through and out of the reaction zone in suspension in hydrocarbon vapors from which it is separated in external separators. Figure 2 is a detail of a control system for regulating catalyst pressure. Figure 3 shows the new method of catalyst feed control as applied to a converter and a catalyst regenerator in which the catalyst is maintained as a dense phase and withdrawn directly from the regenerator and converter for recycling.

Heretofore, in continuously contacting hydrocarbon vapors with subdivided, solid catalysts difficulty has been encountered in obtaining a uniform flow of catalyst into the system. Mechanical force feeding devices have been employed, such as the screw pump, but these have not had much success owing in part to the severe erosion occurring in the mechanical handling of the powdered, solid catalyst, generally of a siliceous nature, and owing in part to the agglomeration of the catalyst into material of progressively larger particle sizes with consequent loss of activity and difficulty in handling.

Attempts have been made to handle the powdered, solid catalysts in liquid slurries, for example, in suspension in feed stock supplied to the system. However, this has not been generally successful in the cracking of heavy oils due to the fact that the proportion of catalyst to oil required is too great to produce a pumpable slurry.

Accordingly, it has been proposed, for example, in U. S. Serial 342,847, filed June 28, 1940, to supply powdered catalyst under pressure to a conversion system by means of a tower in which a catalyst column is maintained and a pressure head is developed. Aeration of catalyst in the tower, using steam, air or inert gas for the purpose, maintains the catalyst in dense but fluid form, providing free flow from the bottom of the tower. The pressure developed at the bottom of the catalyst tower is sufficient to overcome the back pressure in the reaction zone and regeneration zone. The catalyst is fed from the bottom of the tower to the stream to be contacted by means of a star feeder, gate valve, or other device which will suitably regulate the discharge of catalyst.

In the operation of a tower system of this kind, it is sometimes difficult to obtain uniform discharge of catalyst from the base of the tower owing partly to changes in catalyst density within the tower, partly to fluctuation in catalyst level resulting from slight variations in the rate of withdrawal and the rate of charging catalyst to the tower, and partly to changes in pressure on the downstream side of the feed device. It is the particular object of this invention to correct these difficulties arising in the operation of catalyst towers or standpipes. The method of accomplishing this purpose will be readily understood from the drawings.

Referring to Figure 1, oil is charged to the system at 10. This oil may be gas oil, or heavy distillate stock to be cracked into gasoline or it may be a lighter stock such as straight run heavy naphtha of low knock rating to be processed for increasing the knock rating. The feed stock flows through heat exchanger 11 and thence by line 12 to heat exchanger 13 before passing by line 14 to furnace 15. In the furnace it is vaporized and heated to a high conversion temperature, generally 25 to 75 degrees above the temperature desired in the subsequent catalytic reaction. Leaving the furnace the oil vapors flow by line 16 to reactor 17 wherein it is contacted with a suspended, powdered, solid, hydrocarbon conversion catalyst. The catalyst employed for this purpose is in the form of a powder or fine granules, usually finer than 10 mesh, e. g., 100 to 400 mesh, and commonly of a particle size about within 1 to 100 microns. Catalysts for converting heavy oils may be natural clays, fuller's earth, bentonite, montmorillonite, bauxite, etc., usually activated by treatment with acid. Synthetic catalysts are commonly activated silica, silica gel, etc. promoted with one or more metal oxides, such as alumina, magnesia, thoria, titania, zirconia, ceria, and oxides of other metals of the IInd, IIIrd and IVth groups of the periodic system. For the reforming of low knock rating napthas, catalysts of the dehydrogenation type are generally employed, for example, activated alumina on which there is deposited about 5 to 25% chromia, vanadia or molybdena.

The catalyst is supplied to the reactor either directly or in suspension in the hot hydrocarbon vapors. My drawings show the latter method wherein the catalyst is introduced by line 18 in a regulated, uniform suspension hereinafter described. Reactor 17 is provided with sufficient cross sectional area to allow partial sedimentation and hindered settling to occur, thereby increasing the amount of catalyst in the reactor considerably beyond the amount represented by the proportion of catalyst to hydrocarbon vapor charged to the reactor. The ratio of catalyst to oil employed will vary, depending on the activity of the catalyst and other factors but it is usually of the order of 1 to 10 parts of catalyst by weight to 1 part of oil. In a typical operation three parts of catalyst per part of oil are employed. The density of catalyst in the reactor 17, however, may be from 1 to 10 pounds or even 20 pounds per cubic foot, corresponding to approximately 2 to 50 parts of catalyst per part of oil present as vapor in the reactor.

The temperature in reactor 17 lies within the conversion range, generally between 750 and 1100° F., although for most cracking operations a temperature of the order of 900 to 975° F. is satisfactory. For the reforming of naptha a somewhat higher temperature is preferred, for example, 950 to 1050° F. and when operating with naptha I prefer to maintain hydrogen in the reactor, preferably about 1 to 4 mols of hydrogen per mol of naptha charged.

The catalyst suspended in the hydrocarbon vapors flows from the upper part of the reactor 17 by line 19 leading to separators 20 and 21 arranged in series. These separators are of the cyclone type, discharging vapor by line 22 and catalyst by lines 23 and 24. The product vapors pass to scrubber 25 where any fine unseparated catalyst is washed from the vapors by scrubbing oil charged through line 26 and discharged by line 27. The catalyst-free vapors pass by line 28 to fractionator 29 where the products are fractionated into gasoline and heavier stocks. Gasoline vapors and gas are withdrawn by vapor line 30 leading to condenser 31 and receiver 32. Uncondensed vapors and gas are discharged by line 33 while gasoline is withdrawn by line 34. A part of the gasoline is pumped back for reflux through line 35.

A heavier stock, for example, kerosene or light gas oil may be withdrawn by line 36 leading to side stripper 37. The stripped light gas oil is withdrawn through line 38 and cooler 39 while vapors re-enter the fractionator by line 40. Heavier reflux condensate is withdrawn from the base of the fractionator 29 by line 41 leading to heat exchanger 11 where it serves to preheat feed stock as hereinabove described.

A slurry of fine catalyst which is recovered in scrubber 25 is withdrawn as hereinabove indicated by line 27 and forced into feed line 14 leading to furnace 15. A portion of this stock may be cooled in exchanger 13 and recycled by line 26 back to the scrubber 25. If desired, feed stock from line 12 may be diverted in part through valved line 42 leading to line 26 and scrubber 25 wherein it serves to remove catalyst fines from the product vapors.

Spent catalyst in lines 23 and 24 is conducted by line 43 to the catalyst regenerator 44. Air or other oxidizing regeneration gas may be introduced from line 45 and may be used to carry the catalyst into the regenerator. Carbonaceous deposits which are largely responsible for the decrease in catalyst activity are removed from the catalyst by controlled combustion in 44. The oxidizing conditions are regulated to avoid excessive heating of the catalyst in 44 inasmuch as too high temperatures permanently impair catalyst activity. Catalysts differ in their resistance to heat but in general regeneration temperatures within the range of about 1000 to 1200° F. are desirable. Lower temperatures of the order of 850 to 950° F. are difficult to maintain because of the excessive cooling required. Some catalysts of the synthetic type having a high silica content may withstand temperatures of 1400 to 1600° F. Cooling of the regenerator 44 may be accomplished in various ways, for example, by indirect means, by supplying cooling gas directly to the regenerator or by recycling through the regenerator cooled catalyst, partially or completely regenerated. The oxygen concentration of the regeneration gas may be regulated to avoid excessive heating of the catalyst.

From the generator 44 the catalyst is carried in suspension in the spent regeneration gases by line 46 leading to regenerated catalyst hopper 47 where part of the catalyst is dropped out of the gases. The gases then flow by line 48 to regeneration gas separators 49, 50 and 51, from which the spent gas is discharged by line 52. Catalyst recovered in the cyclone separators 49, 50 and 51 is conducted by line 53 back to the catalyst hopper 47. Catalyst hopper 47 is mounted above the catalyst tower 54 and communicates therewith with automatic valves 55 and 56. In operation, the catalyst tower 54 is maintained substantially full of catalyst to provide the desired catalyst pressure at the bottom. Catalyst from 54 flows through valves 57 and 58 into line 18 previously mentioned. The flow of catalyst through line 18 is facilitated by the introduction of a carrier gas, for example, refinery gas, steam, $CO_2$, etc., through line 59. The pressure established by the catalyst head in 54 will be of the order of 5 to 25 pounds per square inch, depending on the design and operation of this tower, which in turn depends on the design of the conversion system and the back pressure existing therein. This pressure just referred to is, of course, the differential pressure between the bottom of the catalyst tower and the top of the catalyst hopper 47. The entire system may be operated under a higher pressure, for example, 50 to 100 pounds per square inch and in the case of naptha reforming, still higher pressures of the order of 200 to 400 pounds per square inch are desirable. The circulation of catalyst, however, in such a system is substantially independent of the gross pressure on the system but dependent on the differential pressure between the catalyst inlet and regenerator outlet.

The catalyst in tower 54 and hopper 47 is maintained in free-flowing condition by introducing aeration gas at 60, 61, 62 and 63. For this purpose I may use steam, $CO_2$, flue gas or other inert gas. The temperature of the catalyst will usually be above the condensation point of steam. Any residual regeneration gas can be stripped from the catalyst by the aeration gas thus introduced.

In one method of operation, aeration gas from the tower 54 is vented through line 64 thereby maintaining the pressure in the top of 54 at a constant value, for example, at atmospheric pressure, or a higher pressure, for example, by adjusting pressure regulating valve 65. It is desirable that the pressure in the top of 54 not exceed the pressure in the bottom of 47. When operating in this manner a constant pressure may be maintained at the bottom of tower 54 by regulating the height of the column of catalyst therein which in turn is accomplished by controlling the operation of valves 55 and/or 56. These valves may be of the rotating type known as "star valves" providing a positive flow of catalyst from 47 to 54, which may be increased or decreased depending on the rate of rotation of the valve. One or more valves may be operated when desired. The operation of valves 55 and 56 may be made automatically responsive to the pressure at the base of tower 54 or the pressure differential across feeder 58 by means of controller device 66. For example, when the pressure in the base of tower 54 tends to fall, controller 66 automatically increases the flow of catalyst through valves 55 and 56, thereby restoring the pressure head within the tower 54, and smoothing out the flow of catalyst through outlet 57 and/or 58. Valves 57 and 58 may also be of the star type or they may be simple gate valves or slide valves. When supplied with catalyst under constant pressure, slide valves will deliver a relatively constant stream of catalyst into the hydrocarbon vapors injected into reactor 17.

Another and preferred method of control consists in venting the aeration gas from the top of the tower 54 through line 67 connected with manifold 68 which in turn communicates with hopper 47 at various levels through valves 69, 70, 71, 72 and 73. Depending on the level of catalyst in 47, a back pressure is exerted against the gases escaping from 54 below the surface of the catalyst in 47. For example, when communication is established between 54 and 47, through 67, 68 and 69, there is added to the pressure in the top of 54 a pressure equal to the column of catalyst in 47 above the level of 69. Gases introduced into 47 in this manner also serve to aerate the catalyst therein. By changing the flow of gas from 69 through one of the other valves 70, 71, 72 or 73 the pressure in the top of 54 may be varied at will or automatically. The operation of valves 69 to 73 may be made responsive to controller 66 as hereinafter described in greater detail, thereby serving to maintain a constant pressure at the catalyst outlet or a constant differential pressure across valves 57 and 58.

Controlling the operation in another way, the pressure at the top of 54 may be varied by automatic release valve 74 which is responsive to pressure controller 66 at the bottom of 54. In this way, the catalyst pressure at the valves 57 and 58 may be maintained constant, although the height of the column of catalyst in 54 may vary within a considerable range.

Figure 2 shows a detailed arrangement of pressure controls applied to my divided catalyst tower. Referring to this figure, the principal parts correspond to the catalyst tower shown in Figure 1. Where it is desired to maintain a constant head of catalyst in 154, this may be accomplished by pressure differential controller 166. This controller responds to the pressure differential between the top and bottom of the catalyst tower 154 and in turn regulates valve motor 155 through electric or pneumatic control line 166a. Valve motor 155 adjusts the position of slide valve 156 to admit more or less catalyst into 154 from hopper 47a. When operating with this control alone and with valve 174 set in the open position insuring the same pressure in the top of 154 as exists in the top of 47a, a constant pressure differential will be maintained across the catalyst tower between the bottom of 154 and the top of 47a.

It is sometimes desirable to maintain a constant pressure differential across the outlet valve 158 especially where a slide valve is employed at 158 and constant flow is desired. In that case I may employ pressure differential controller 157 across valve 158 and control the pressure relief valves 169, 171, 173 and 174 in response thereto. For this purpose a variable air pressure may be supplied to control line 157a, acting on diaphragm valves 169, 171, 173 and 174. At low pneumatic pressure, valve 169 may open, the other valves remaining closed. At increasing pressure, valves 171, 173 and 174 may open in succession releasing gas from the top of 154 into 47a at successively higher levels, i. e., lower back pressures. Catalyst may be prevented from flowing back through the valves 169, 171, and 173 when not in use by suitable check valves or by interlocking automatic valves. In this way the pressure exerted on the surface of the catalyst in 154 and transmitted thereby to the valve 158 is quickly varied to maintain the desired pressure differential across valve 158 as detected by controller 157.

In order to insure a reasonably constant level of catalyst in 154 it is desirable that controller 166 be operated simultaneously with controller 157. Operation of 166 may be quite independent of 157 but in order to increase the maximum range of controller 157, I may connect the two controllers through line 166b and arrange for controller 157 to have an overriding effect on controller 166; for example, controller 157 may raise or lower the general level of the catalyst in 154 while the controller 166 may maintain that level at approximately the range selected. The outlet valve 158 may be manually controlled or automatically controlled in response to some other part of the conversion system.

Again referring to Figure 1, inasmuch as some catalyst is unavoidably lost from the system, fresh catalyst may be introduced from time to time from fresh catalyst hopper 75 communicating with hopper 47 through line 76. If desired, the fresh catalyst may be added in batches without disturbing the flow of catalyst from the bottom of tower 54 inasmuch as the pressure control just described compensates automatically for irregular delivery of catalyst to hopper 47.

Another modification of my hydrocarbon conversion apparatus is shown in Figure 3. In this modification a higher density of catalyst and oil is maintained in the reactor and also in the regenerator, partly by virtue of operating at lower vapor velocity and partly by returning the catalyst from the outgoing vapors and gases directly to the catalyst body within the reactor and/or the regenerator. Furthermore, whereas the apparatus shown in Figure 1 employed a single catalyst tower which established sufficient catalyst pressure to overcome the back pressure of the reactor and the regenerator combined in series, the apparatus in Figure 2 is shown with a separate catalyst tower for feeding the reactor and another for the regenerator. Still a third catalyst tower is provided for recycling hot catalyst from the regenerator through a cooler to maintain the proper regenerator temperature. In this system the catalyst towers may be lower since the pressure differentials in the system are generally lower and since the pressure head required is built up in two towers instead of one.

Referring to the drawings, hydrocarbon feed stock which may be a distillate gas oil, naptha or even a residuum may be introduced by line 80 to heater 81 and discharged at high temperature through transfer line 82 leading to reactor 83. Steam, preferably highly superheated, may be introduced into the vapors by line 84. The catalyst from tower 86 is charged to the steam of oil and vapors at 85. Conversion takes place as before in 83, the catalyst being maintained therein in a so-called dense phase which may have a density of around 5 to 25 pounds of catalyst per cubic foot, the catalyst having a high state of agitation resulting from the introduction of vapor at a low point in the reactor. At the top of the reactor 83 the vapor velocity is still further reduced by increasing the diameter of the reactor and the catalyst flows by gravity through line 87 leading into hopper 88. Vapors in 83 pass through internal cyclone separators 89, 90 and 91 arranged in series to recover substantially all the catalyst from the vapors. The recovered catalyst falls back into the dense phase of the reactor through dip legs 92, 93 and 94. The product vapors pass by line 95 to fractionator 96 where gasoline and lighter products are withdrawn by vapor line 97 leading to condenser 98 and receiver 99. Uncondensed vapors are discharged by vent 100 and gasoline is withdrawn by valved line 101. Heavier products than gasoline may be withdrawn as side streams from column 96, for example, kerosene or light gas oil, may be withdrawn at 102 and heavy gas oil at 103. A heavy reflux containing some catalyst in suspension which carried over from 91 is withdrawn at the base of tower 96 through line 104 and forced by pump 105 and line 106 back to heater 81 where it is mingled with the feed stock and charged back to reactor 83.

A continuous but irregular stream of catalyst flows through catalyst hopper 88 and thence through valve 107 into tower 108 in which sufficient pressure head is maintained to force the catalyst through valve 109 into line 110 and regenerator 111. A stripping gas, e. g., steam, is introduced into transfer line 87 to remove hydrocarbon products from the catalyst.

The pressure in the reactor 83 and regenerator 111 may be of the order of 5 to 30 pounds and usually 15 to 25 pounds. The movement of catalyst through line 110 is facilitated by a carrier gas introduced through valve 112. This gas may suitably be air supplied by blower 113 and preheated in heater 114. If desired, however, the main stream of air required for regeneration may be conducted through valve 115 and line 116 entering the base of regenerator 111. It is desirable to maintain a dense phase catalyst in regenerator 111 as in reactor 83. Spent regeneration gases are discharged from 111 through internal cyclone separators 117, 118 and 119, thence by line 120 leading through cooler 121 into electrical precipitator 122 where fine catalyst carried over is recovered and returned to the system by line 123, the gases being discharged from the system by vent 124.

Catalyst separated in 117, 118 and 119 falls back into the dense phase of the regenerator through dip legs 125, 126 and 127, respectively. Regenerated catalyst overflows into line 128 leading to regenerated catalyst hopper 129 which discharges through valve 130 into tower 86. Catalyst also overflows from regenerator 111 through 131 into hopper 132, valve 133 and into tower 134 which provides sufficient pressure head to force the catalyst with a cooling gas, for example, cold air, through line 135 and indirect cooler 136, discharging back to the regenerator through line 137. Conveying air for the coooling catalyst stream is supplied by line 138.

The operation of towers 86, 108 and 134 is similar to the operation of tower 54 in Figure 1. Aeration gas, for example, steam, is introduced at the base through lines 139, 140 and 141, respectively. Aeration gas from the top of each tower is directed into manifolds 142, 143 and 144, respectively. From the manifolds gas may be vented into the hoppers at various levels as previously described. I may employ a pressure regulating valve located at 145, discharging directly into the hopper 129 above the catalyst level and maintaining the desired pressure on the top of the catalyst tower 86. The same arrangement may be employed with catalyst towers 108 and 134. Catalyst hopper 88 is vented to reactor 83 by line 146 while hoppers 129 and 132 are vented to the regenerator by vent lines 147 and 148, respectively. Aerating gas is introduced at the bottom of the catalyst hoppers by lines 149, 150 and 151. Valves 152 and 153 control the discharge of regenerated catalyst from towers 86 and 134, respectively. Other catalyst flow control means as described in connection with Figure 1 and Figure 2 may be employed.

By employing a separate catalyst tower for the reactor and another for the regenerator the pressure differential across each tower is reduced thereby reducing the height of the towers necessary to maintain catalyst circulation. It is important that the flow of catalyst into each unit, i. e., the reactor and the regenerator, be maintained quite uniform in order to avoid the migration of a large portion of the catalyst from one vessel to the other. The use of my control method is, therefore, of great importance in this type of system.

Although I have described my invention with respect to certain embodiments thereof, it is intended that its scope be defined by the following claims.

I claim:

1. An apparatus for introducing powdered solids into a zone of higher pressure in a uniformly regulated manner which comprises a vertically elongated tower, a hopper above said tower, a valved communication between said hopper and said tower, an inlet for solids to said hopper, an outlet for solids from the bottom of said tower leading to said zone of higher pressure, and means for controlling the operation of said valve between said hopper and said tower in response to a change in the pressure at the outlet of said tower to effect an increase in flow of solids thru said valve when the outlet pressure decreases.

2. In the process of converting hydrocarbon oils wherein the vapors of said oils are contacted with a suspended, subdivided, solid catalyst at conversion temperature in a reaction zone, wherein the activity of the catalyst is reduced by the deposition of carbonaceous matter thereon, hydrocarbon vapors are separated from the catalyst, the catalyst is regenerated in a regeneration zone by contacting with an oxidizing gas and the regenerated catalyst is reintroduced into said reaction zone, and wherein the pressure required to introduce said catalyst into said reaction zone is obtained by maintaining a head of catalyst in an elongated, vertical column from which catalyst is withdrawn at the bottom and to which catalyst is charged at the top, the improvement comprising controlling the height of said column and the pressure at the bottom thereof by automatically increasing or decreasing the rate of flow of catalyst charged at the top of said column in response to variations in the pressure at the bottom.

3. The method of controlling the flow of powdered solids into a zone of higher pressure which comprises maintaining said solids in free-flowing, aerated condition in a vertical column, maintaining a head of catalyst in said column, adding solids to said column, withdrawing solids from the bottom of said column and regulating the pressure of solids at the bottom of said column by applying a controlled gas pressure to the top of said column.

4. The process of claim 3 wherein said gas pressure at the top of said column is derived from aeration gas supplied to the bottom of said column.

5. An apparatus for controlling the flow of powdered solids which comprises an elongated, vertical tower, a hopper above said tower and in communication therewith, a valve controlling the communication between said hopper and said tower, a valve at the bottom of said tower for controlling the discharge of powdered solids against a back pressure, means for introducing aeration gas into said tower at a low point, means for withdrawing aeration gas at the top of said tower and means for controlling the pressure imposed on said aeration gas at the top of said tower in response to changes in pressure at the bottom of said tower.

6. The apparatus of claim 5 wherein a manifold is provided for introducing said aeration gas withdrawn from the top of said tower into said hopper at a selected one of several levels therein.

7. The apparatus of claim 5 wherein means are provided for introducing said aeration gas withdrawn from the top of said tower into said hopper at a low point thereof.

8. An apparatus for controlling the flow of powdered solids into a zone of higher pressure which comprises an elongated, vertical tower, a vertically elongated hopper above said tower and in communication therewith, a valve controlling the communication between said hopper and said tower, a valve at the bottom of said tower for controlling the discharge of powdered solids against said higher pressure, means for introducing aeration gas at a low point in said tower, means for withdrawing aeration gas at the top of said tower and means for introducing said withdrawn aeration gas into said hopper at a point therein below the level of powdered solids which it may contain.

9. An apparatus for feeding powdered catalyst into a hydrocarbon conversion system operating under pressure which comprises a vertical tower, a hopper above said tower for supplying catalyst thereto, a catalyst discharge valve at the bottom of said tower for regulating the flow of catalyst into said hydrocarbon conversion system, a catalyst supply valve between said hopper and said tower and means for regulating said catalyst supply valve in response to the differential pressure across said catalyst discharge valve.

10. The apparatus of claim 9 wherein said catalyst supply valve is regulated by a controller responsive to the differential pressure across said tower and the range of said controller is regulated in turn by the differential pressure across said catalyst discharge valve.

11. In the process of converting hydrocarbon oils wherein the vapors of said oils are contacted with suspended, subdivided solid catalysts at conversion temperature and under superatmospheric pressure, the improvement comprising maintaining a column of catalyst above the point of introduction of the catalyst into said vapors, discharging the catalyst from said column into said hydrocarbon vapors, supplying catalyst to said column from an elevated source of supply, aerating the catalyst in said column to maintain it in free-flowing condition, discharging aeration gas from the top of said column into said catalyst supply at a point below the level of catalyst therein, thereby providing pressure at the top of said column, and maintaining a substantially constant pressure of catalyst at said point of introduction by regulating the height of said column of catalyst in response to changes in the pressure at the base thereof.

12. The method of controlling the rate of catalyst flow in a hydrocarbon conversion system, which comprises maintaining a constant pressure differential across the catalyst exit conduit of an elongated vertical column containing two zones of aerated catalyst with an intermediate dilute or gaseous phase zone between said two zones, by controlling the quantity of material in the lower zone and the pressure in said intermediate zone.

13. The method of claim 12 wherein minor variations in pressure at the exit conduit are effected by varying the pressure in the intermediate zone and major variations in pressure at the exit conduit are effected by varying the quantity of material in the said lower zone.

14. In the process of converting hydrocarbon oils wherein the vapors of said oils are contacted with suspended, subdivided solid catalysts at conversion temperature and under superatmospheric pressure, the improvement comprising maintaining a column of catalyst above the point of introduction of the catalyst into said vapors, discharging the catalyst from said column into said hydrocarbon vapors, supplying catalyst to said column from an elevated source of supply, aerating the catalyst in said column to maintain it in free-flowing condition, discharging aeration gas from the top of said column into said catalyst supply at a point below the level of catalyst therein, thereby providing a gas pressure at the top of said column and regulating the pressure of catalyst at the point of discharging catalyst from said column by controlling the pressure of aeration gas discharged from the top of said column into said source of supply.

ARTHUR L. CONN.